United States Patent [19]

Czech et al.

[11] 3,939,674

[45] *Feb. 24, 1976

[54] SUSPENSION MOUNTING ASSEMBLY FOR AUTOMATIC WASHERS

[75] Inventors: James I. Czech, Lexington, Mass.; Roy C. Oakley, Jr., Coloma, Mich.

[73] Assignee: Whirlpool Corporation, Benton Harbor, Mich.

[ * ] Notice: The portion of the term of this patent subsequent to Dec. 10, 1991, has been disclaimed.

[22] Filed: Nov. 26, 1973

[21] Appl. No.: 419,128

Related U.S. Application Data

[63] Continuation-in-part of Ser. No. 325,983, Jan. 23, 1973, Pat. No. 3,854,308.

[52] U.S. Cl. .......................... 68/23.3; 248/358 AA
[51] Int. Cl.² ......................................... D06F 37/24
[58] Field of Search ................... 68/23.1, 23.2, 23.3; 248/358 AA; 267/136, 178

[56] References Cited
UNITED STATES PATENTS

| | | | |
|---|---|---|---|
| 2,828,934 | 4/1958 | Markowski | 248/358 AA |
| 3,286,960 | 11/1966 | Douglas | 248/358 AA |
| 3,476,253 | 11/1969 | Fosler | 68/23.3 |
| 3,548,615 | 12/1970 | Ohnishi | 68/23.1 |
| 3,854,308 | 12/1974 | Czech | 68/23.3 |

Primary Examiner—Harvey C. Hornsby
Assistant Examiner—James A. Niegowski
Attorney, Agent, or Firm—Hill, Gross, Simpson, Van Santen, Steadman, Chiara & Simpson

[57] ABSTRACT

A vertical axis washing machine characterized by a washing receptacle and drive means supported by three or more suspension element assemblies which each comprise a coil spring and an upper and lower mounting member each having a projection telescopically received in the respective end of the spring. During a washing cycle, the addition of washing liquid to the receptacle causes vertical displacement of the springs so that the projections on the upper and lower mounting members engage each other to provide a substantially solid support for the receptacle. With removal of the washing liquid from the receptacle, the spring forces raise the upper projection from the lower projection to eliminate the aforementioned support but the assemblies will to some extent, snub horizontal movement and dampen any simultaneous vertical movement, especially during excursion of the receptacle as the rotational frequency of the receptacle during an extraction cycle passes through the "critical" or natural frequency of the suspended system. A vertical attitude of the washing receptacle is attained despite the fact that its center of gravity is not located at its geometric center by providing the suspension element assemblies with differing spring rates by varying the number of free coils of a spring in each of the suspension element assemblies.

8 Claims, 10 Drawing Figures

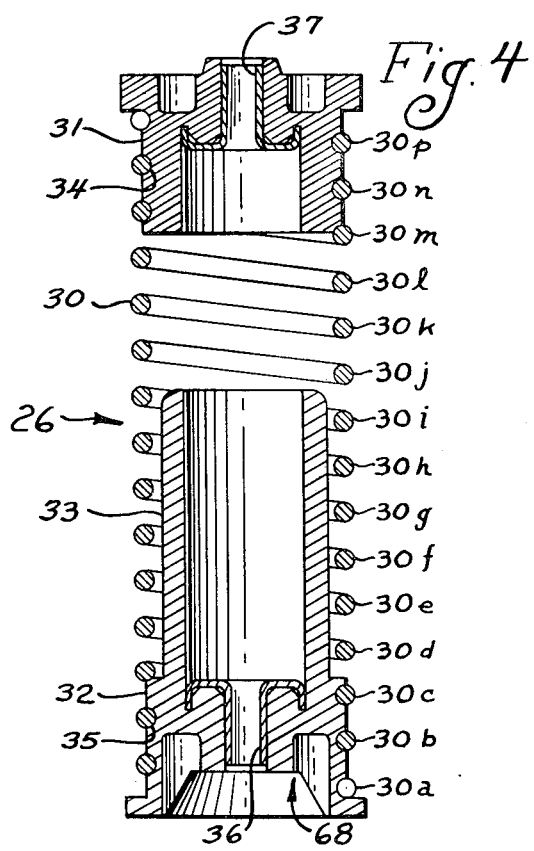
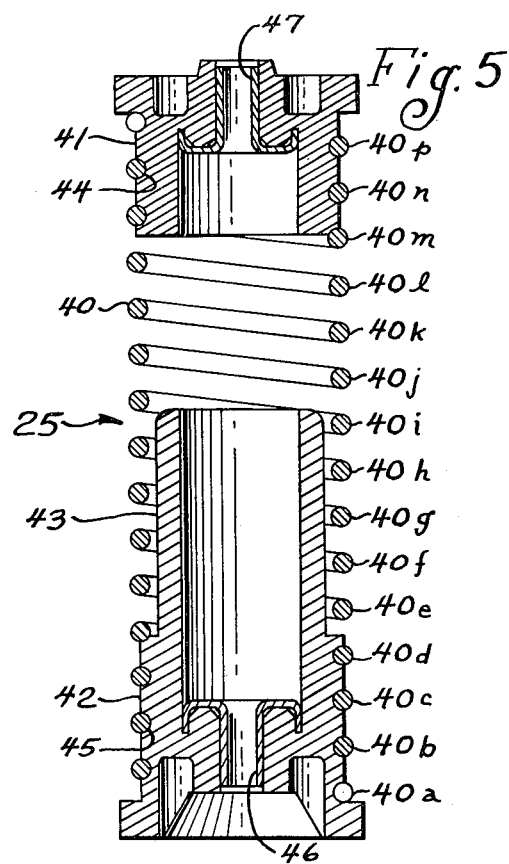
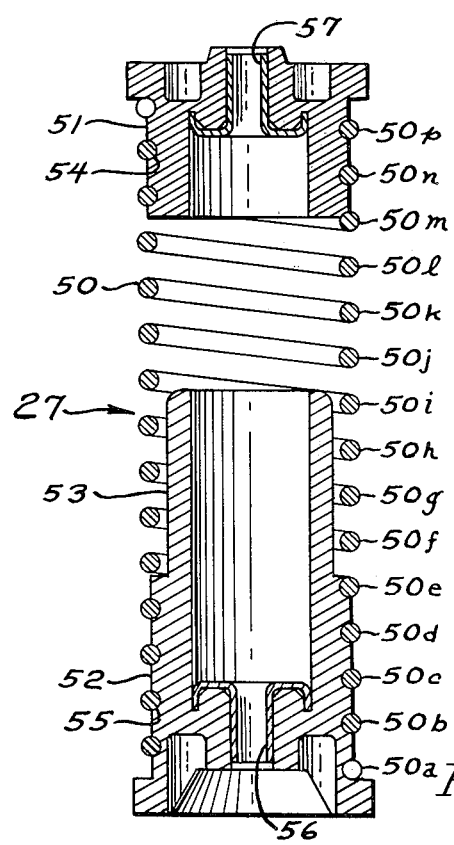
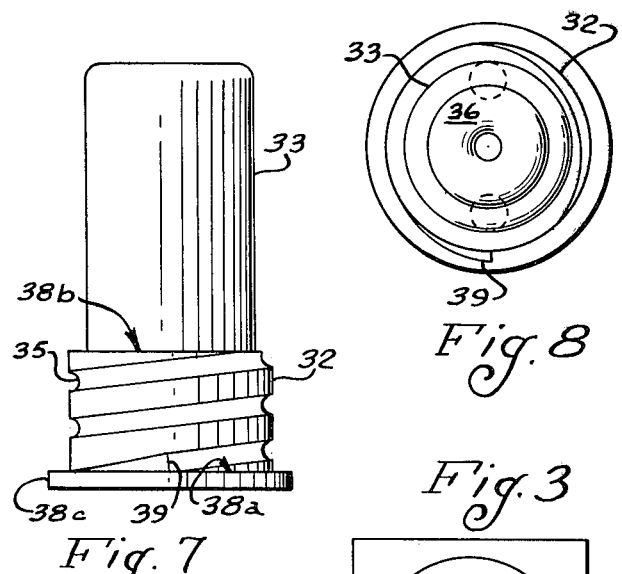
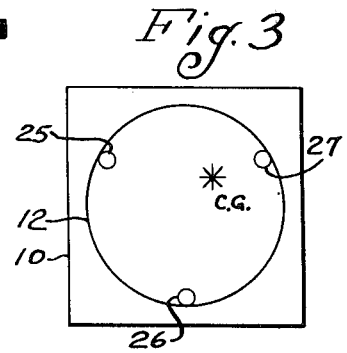

SUSPENSION MOUNTING ASSEMBLY FOR AUTOMATIC WASHERS

CROSS-REFERENCE TO RELATED APPLICATIONS

The present application is a continuation-in-part application of our copending application Ser. No. 325,983 now U.S. Pat. No. 3,854,308 entitled "Suspension Mounting Assembly For Automatic Washer" filed Jan. 23, 1973.

BACKGROUND OF THE INVENTION

1. Field of the Invention

This invention generally relates to laundry appliances, such as automatic washing, rinsing and drying machines, and more particularly refers to a suspension assembly for supporting a washing receptacle or basket and drive assembly from a cabinet base to substantially isolate the cabinet from vibration caused by the oscillation or rotation of the basket.

2. Description of the Prior Art

The elimination of excessive vibrations in automatic washing, rinsing and drying machines for home use has been an area of continuing development. Excessive vibrations usually occur when there is a non-uniform distribution of clothes in the the rotating clothes container or basket as the same spins rapidly to centrifuge excess water from the clothes. While a high rate of spin is desirable during the centrifuging operation, the maximum rate of spin is limited by the capabilities of the tub suspension system to isolate the machine cabinet from the vibrations or oscillatory motion caused by the unbalanced load. Various structures which utilize springs alone or a complex structure of springs coacting with damping elements such as cam surfaces or frictional clamps have been suggested to eliminate or minimize these problems. Examples of these different structures are disclosed in U.S. Pat. Nos. 2,243,565; 2,268,204; 2,414,506; 2,454,112; 2,526,048; 2,665,007; 2,717,135; 2,734,707; 2,775,883; and 3,361,398. A complex suspension system may permit a high rate of spin; however, in order to maintain the cost of the laundry appliance within the reach of most consumers, the suspension system should also be compact, inexpensive and easily assembled.

In addition to eliminating vibrations during an extraction cycle, it is desirable to stabilize the washing tub or receptacle during the washing cycle to prevent excessive splashing of liquid therefrom due to the movement of the tub and liquid caused by agitation. Different structures for changing the suspension characteristic in response to the filling of the receptacle with water have been suggested and examples of these structures are disclosed in some of the above-mentioned United States Patents and in U.S. Pat. Nos. 2,296,260 and 2,296,261.

To provide a suspension system for an unbalanced load or to isolate a device from vibration or an externally applied impact force various structures utilizing springs in different arrangements, springs in combination with dampening devices, or springs having different spring rates or characteristics have been suggested. Examples of some of these structures are disclosed in U.S. Pat. Nos. 1,089,748; 1,290,159; 2,678,796; 3,169,737; and 3,286,960.

SUMMARY OF THE INVENTION

The present invention is directed to a suspension means particularly useful for suspending a receptacle in a cabinet of a vertical-axis washing machine which suspension means dampens excursion of the receptacle during an extraction cycle of operation.

The suspension system has a plurality of essentially identical helical springs vertically oriented with each having a plurality of coils. Upper mounting means are provided for mounting each of the springs to the receptacle at one end and lower mounting means are provided for mounting each of the springs to a base at the other end. One of the mounting means of each assembly, preferably the lower means, has a cylindrical projection extending coaxially into the helical spring with an annular spacing therebetween so that relative horizontal movement displacing of the spring with respect to the one mounting means causes contact between some portions of the projection and the coils of the spring to snub the horizontal movement and also to dampen any simultaneous vertical movement. Preferably, each mounting means has a cylindrical portion with a helical groove to receive the helical spring configuration and the cylindrical projection extends from the cylindrical portion.

BRIEF DESCRIPTION OF THE DRAWINGS

FIG. 3 is a top schematic view of the automatic washer showing the positions of the three suspension elements and the center of gravity of the machine;

FIGS. 4, 5 and 6 are sectional views of the three suspension elements or assemblies;

FIG. 7 is a side view of the lower spring mount of the suspension element shown in FIG. 4;

FIG. 8 is a top view of the lower spring mount of FIG. 7;

DESCRIPTION OF THE PREFERRED EMBODIMENTS

Figure 1:
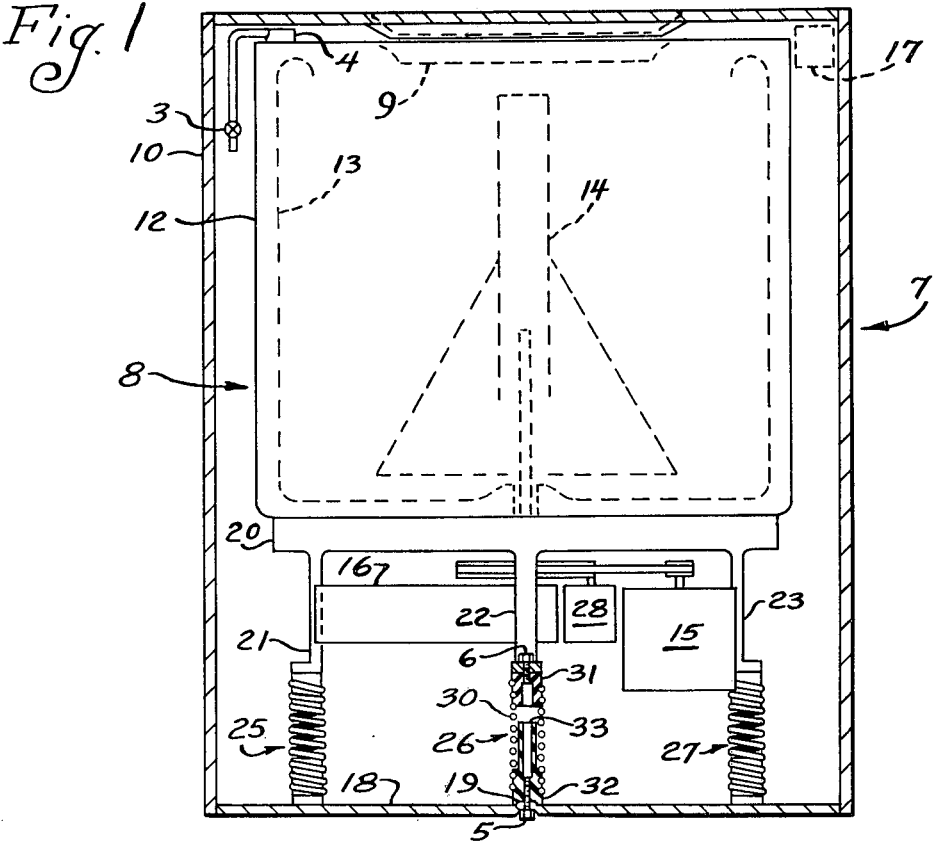
FIG. 1 is a sectioned view of the automatic washer showing the suspension of the invention with little or no wash liquid in the tub.
Figure 2:
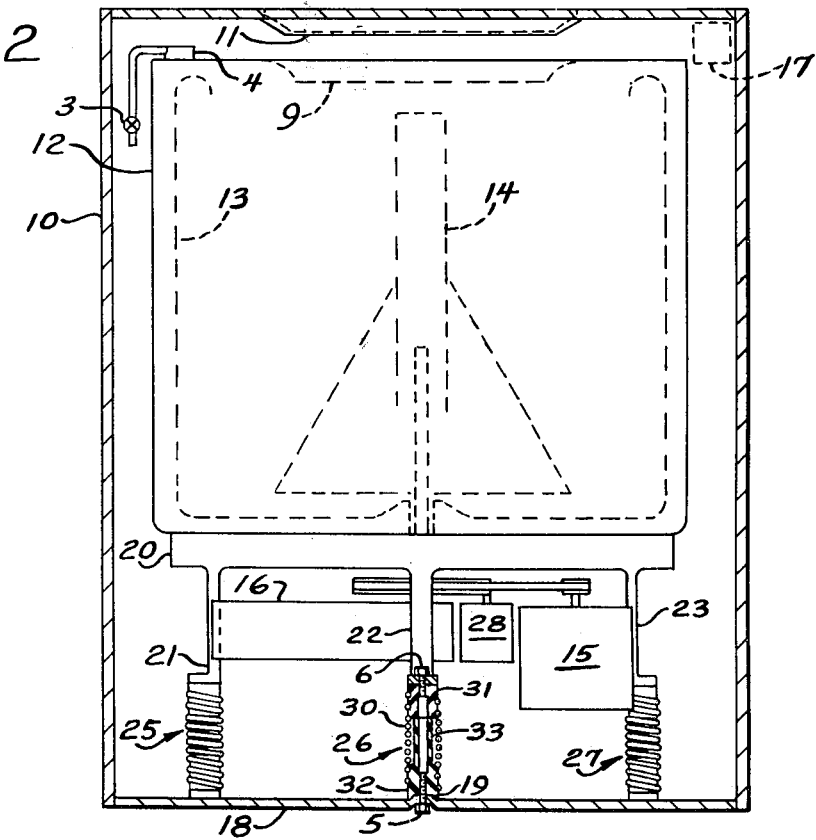
FIG. 2 is a sectioned view of the automatic washer showing the suspension of the invention with the tub filled with wash liquid.

The principles of the present invention are herein disclosed as incorporated in a suspension means or suspension system which comprises three helical spring assemblies or elements 25, 26 and 27 for an automatic washer 7 as diagrammatically illustrated in FIGS. 1 and 2. If should be understood however, that the principles of the invention could be applied equally well to a suspension system utilizing more than three spring assemblies. Supported by these three helical spring assemblies or elements is a conventional clothes receptacle assembly 8 including a drive means. The clothes receptacle assembly comprises a base plate 20, attached to the top of which is a tub 12 with a rotatable perforate basket 13 mounted inside for receiving clothes to be washed. An agitator 14 is provided inside the basket 13 to agitate a clothes load during the washing cycle. The drive means for the agitator 14 and basket 13 includes a motor 15 and a transmission 16. Water enters the tub 12 through a solenoid operated valve 3 and a water inlet 4 from an appropriate source (not shown). A pump 28 is provided to pump the washing liquid from the tub 12 through an appropriate plumbing system (not shown) to a drain (not shown). A conventional timer 17 is provided to control the various cycles of the automatic washer. The receptacle assembly 8, the drive means and various valves are enclosed in a cabinet 10 having a base 18.

As illustrated in FIG. 4 by helical spring assembly or suspension element 26, a suspension element consists of a helical spring 30, an upper spring mounting or end member 31 and a lower resilient spring mount or end member 32. The upper spring mount 31 is attached to a support 22 of the base plate 20 of the washing machine receptacle assembly by a screw 6. The lower spring mount 32 is attached to the cabinet base 18 by a screw 5. At the point of attachment of the lower spring mount 32 to the cabinet base, a protrusion 19 is provided to facilitate proper positioning of the mount on the base. Thus the suspension means of the present invention extends between a pair of machine members consisting of the receptacle assembly and the cabinet base. This suspension element mounting and construction provides for the unique features of the suspension system of the automatic washer as is hereafter explained.

The automatic washer has conventional cycles of agitation, pump out, and extraction or centrifuging. During operation of the automatic laundry appliance or washing machine 7, the tub 12 is first filled with water or other laundry solution through the inlet 4 and the agitator 14 is oscillated via the transmission unit 16 and the motor 15. After completion of that operation, the water is drained from the tub 12 by pump 28 and the perforate basket 13 is thereafter rotated at a high speed to extract or centrifuge the water from the clothes contained in the basket. In the event the clothes are non-uniformly located or distributed within the basket during the extraction operation, the basket, tub, and base will together execute an oscillatory motion, which, if transmitted to the cabinet, may cause an undesirable and excessive vibration. The suspension system of the present invention is designed through the use of springs having a low spring rate (lb. force applied/in. deflection) to substantially isolate the rotating and oscillating parts from the cabinet 10 and the cabinet base 18 during the extraction cycle, thereby preventing vibration transfer.

Because of the low spring rate of the suspension springs, when the water is added to the tub 12 for the agitation cycle, the weight of the water added causes the receptacle assembly 8 to move down against the upward force of the springs until the upper and lower spring mounts bottom against each other. As illustrated by assembly 26 in FIG. 2, upper spring mount 31 is bottomed against a hollow cylindrical portion or projection 33 of the lower spring mount 32. During the pump out cycle, water is pumped from the tub 12 by the pump 28 to an appropriate drain. The upward force of the springs is then greater than the weight of the receptacle assembly 8 without the water and the assembly moves upward to the position shown in FIG. 1. In this portion of the pump out cycle and in the extraction cycle, as illustrated by assembly 26, the upper mount 31 and the cylindrical portion or projection 33 of the lower mount 32 are no longer in contact, and the receptacle assembly is suspended only on the springs.

It is therefore contemplated by the present invention to allow the suspension system to provide a substantially solid support for the receptacle assembly during the agitation cycle and some dampening of forces during a normal spin cycle. These characteristics are desirable because during the washing cycle large forces are created by the oscillatory motion of the agitator against the clothes and the water in the tub, and a relatively firm or stable tub support is needed to prevent significant movement or excursion of the tub within the cabinet which might cause damage to the cabinet or which might cause the liquid in the tub to splash out a top opening 9 in the tub and run down onto the electrical components such as the motor 15 and cause electrical shorting. The relatively firm or stable base during the agitate cycle is provided in the instant invention by the contact of the upper and lower spring mounts when water is added to the tub.

However, during the extraction cycle it is best to provide only a limited amount of dampening since if an unbalance occurs in the basket due to an off balance load, the forces created by the off balance load will be most effectively isolated from the cabinet base by a suspension system with a low dampening coefficient. Furthermore, a suspension system with a low spring rate generally has a lower natural frequency so that during acceleration of the basket at the start of the extraction cycle, the basket will more quickly pass through the critical speed. The term "critical speed" is the rotational speed of the basket which approximates the natural frequency of the suspended system and this speed may be, for example, about 100 revolutions per minute.

When the basket is rotating at or near the critical speed, the tendency of excursion or orbital movement of the basket, especially a basket carrying an unbalanced load, is substantially increased. As a practical matter, when the spinning basket has passed through the critical speed, excursion of the tub and basket assembly within the cabinet may no longer be a problem. Therefore the continued application of dampening to prevent excursion after the basket has exceeded the critical speed may tend to unnecessarily transfer motion to the cabinet base.

Due to the contact between the upper and lower mounting means or spring mounts of each assembly 25, 26 and 27 as the springs are compressed by the filled receptacle, the suspension system provides a substantially solid support for the receptacle assembly during the agitation cycle. However, the separation of the upper and lower spring mounts when the liquid is drained from the tub provides the system with a low spring rate for the extraction cycle. Because of the low spring rates which are utilized and which allow relatively free movement of the receptacle, it is necessary to additionally limit any large excursions of the receptacle as the spinning basket approaches and passes through the critical speed in order to prevent excessive noise and even damage to the appliance.

Figure 9:
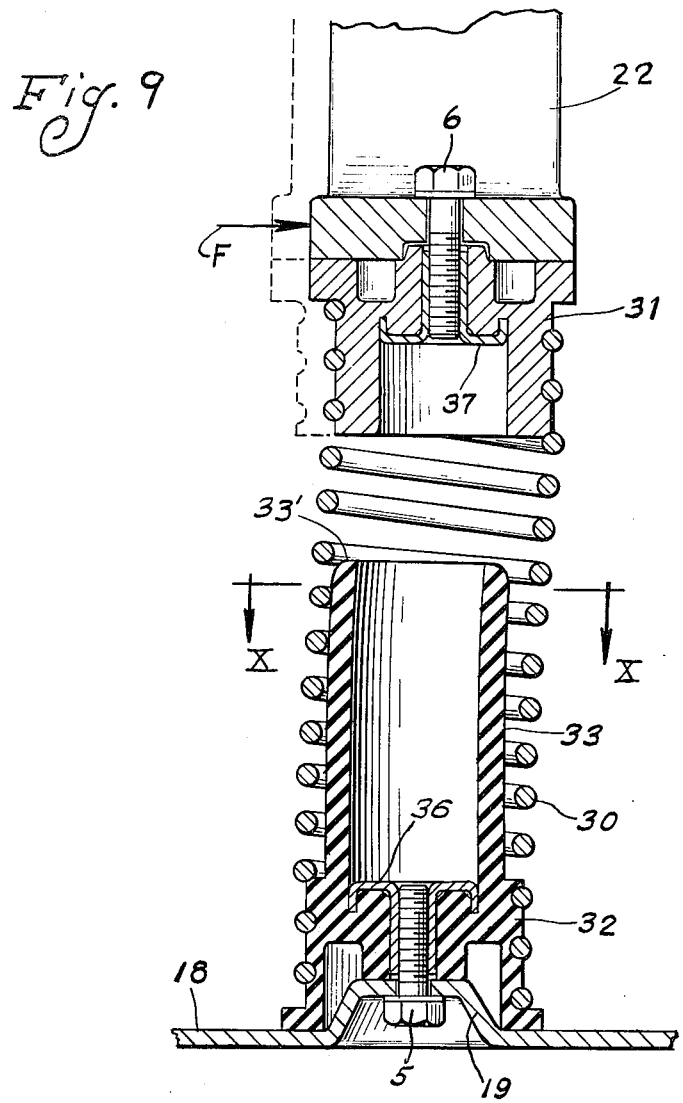
FIG. 9 is a sectional view of the assembly of FIG. 4 illustrating a horizontal deflection caused by the indicated horizontal force.
Figure 10:
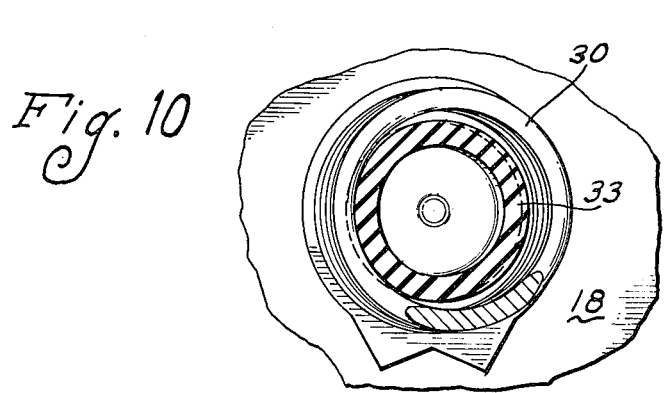
FIG. 10 is a cross-sectional view taken on line X—X of FIG. 9.

The instant suspension system provides for so limiting excursion of the tub and basket assembly as the basket is accelerated through the critical speed during the extraction cycle, and has the desirable feature of increased effectiveness proportionate to the increase of such excursion. During the spinning mode of operation, the suspension system will have a snubbing effect on any horizontal movement which exceeds a given amount and will selectively dampen vertical excursion during such excessive horizontal movement of the tub and basket assembly. To accomplish this selective dampening, the lower spring mount 32 for the assemblies 26 is provided with an integral hollow cylindrical extension or projection 33 (FIGS. 4, 7 and 8). The projection 33 has an outer diameter which is smaller than the inner diameter of the spring 30 and the projection 33 extends coaxially into one end of the spring 30. As illustrated in FIG. 4, when no horizontal forces are applied to the receptacle assembly 8, the projection 33 and the inner surfaces of the coils of the spring 30 are separated by an annular space. When a horizontal force indicated by arrow F (FIG. 9) is applied to the receptacle assembly 8, the spring 30 is deflected into engagement with the extension 33. Preferably, the lower spring mount 32 and the projection 33 are made of a resilient material such as plastic or rubber and the hollow projection 33 will be somewhat deformed by engagement with the spring 30. The deformation of the projection 33 (FIG. 10) will begin adjacent the upper or free end 33' and with greater force being applied will progress along the projection toward the base wall 18. This engagement creates frictional forces to oppose vertical forces generated by the spinning basket and the result is a dampening of vertical movement of the basket with the severity of dampening increasing as the amount of engagement and deformation increases. The deformation of the projection 33 will also have a desirable snubbing effect on the horizontal forces and aid in preventing the receptacle assembly from coming into contact with the cabinet 10 or components, such as timer 17, which are mounted therein. As illustrated in FIGS. 5 and 6, each assembly 25 and 27 has a lower spring mount 43 and 52, respectively, which have projections 43 and 53, respectively, all similar to the one just described.

An advantage of the dampening provided by the coaction of the spring 30 and projection 33 as just described is that this dampening is only present during substantial excursion or horizontal movement of the receptacle assembly. Thus, the dampening referred to above will not occur when the basket is spinning at a speed above critical speed if there is only a small unbalance in the load, and therefore in such a case will not cause an unnecessary transfer of motion to the cabinet base during the spinning mode of operation.

To reduce noise, the material of each of the mounts 32, 42 and 52 and their respective projections 33, 43 and 53 may advantageously be provided with a suitable lubricant, and this lubricant may be provided by impregnating the member prior to assembling the elements of the spring assemblies. However, substantial lubrication of the projections will adversely decrease the frictional coefficient between the surface of the projection and the spring thereby lessening the desired dampening effect on the receptacle assembly. The noise generated between projections and spring may also be minimized or eliminated by selecting a suitable material for the projection such as a neoprene compound with 4½% parafin which has static and dynamic coefficient of friction for contact with the spring material which are nearly equal.

The suspension element assemblies further provide for a vertical attitude of the receptacle assembly 8 when not loaded with clothes and washing liquid. Because the center of gravity of the receptacle assembly is not located on the geometric center of the receptacle assembly, due to the off center placement of motor 15 and other machine components, the suspension assemblies must provide a means of attaining a vertical attitude of the receptacle. With the three suspension elements 25, 26 and 27 equally spaced from the center of the machine and 120° apart, as shown in FIG. 3, it is required that the three suspension elements have differing spring rates in order to maintain the vertical attitude of the tub and agitator when the tub is not loaded with clothes and washing liquid. Of course, suspension elements of differenting spring rates can also be designed and utilized to maintain the vertical attitude of a receptacle assembly where the suspension elements are not equally spaced from the center of or about the machine. The three elements 25, 26 and 27, shown in FIGS. 4, 5 and 6, are of differing spring rates to provide for a vertical attitude of the tub assembly so that the weight of the receptacle will deflect each element the same amount even though each is supporting a different weight. Each element comprises a sprng, an upper resilient spring mount, and a lower resilient spring mount. The three springs 30, 40 and 50 are essentially identical, each having the same free length, diameter of wire and number of coils. Each of the three upper spring mounts 31, 41 and 51 are also essentially identical with each being generally cylindrical and having helical grooves 34, 44 and 54 on their cylindrical surface to receive coils of the springs. Each of the grooves 34, 44 and 54 are of the same length so as to receive the same number of coils of the respective springs 30, 40 and 50. Metal inserts 37, 47 and 57 are provided in the respective upper mounts 31, 41 and 51 for attachment of the mounts to supports 22, 21 and 23, respectively.

Each of the lower resilient spring mounts 32, 42 and 52 are cylindrically shaped and have helical grooves 35, 45, and 55, respectively, on their cylindrical surface and have the projections or extensions 33, 43 and 53, respectively, for the purposes previously discussed. Metal inserts 36, 46 and 56 are provided in the lower mounts 35, 45 and 55, respectively, to receive bolts or screws to secure the mounts to the cabinet base 18. The spiral or helical grooves provided in the lower spring mounts are of differing lengths to provide for receiving different numbers of coils of the respective springs. As shown in FIG. 4, lower spring mount 32 has a groove 35 of sufficient length to receive approximately 2.5 coils, (coils 30a, 30b and one half of coil 30c, of spring 30). In FIG. 5, lower spring mount 42 has a groove of sufficient length to receive approximately 3.5 coils, (coils 40a, 40b, 40c and one half of coil 40d, of spring 40). In FIG. 6, lower spring mount 52 is provided with a spiral groove of sufficient length to receive approximately 4.25 coils, (coils 50a, 50b, 50c, 50d and one quarter of coil 50e of spring 50).

Being representative of all the lower spring mounts 32, 42 and 52, mount 32 is shown in FIGS. 7 and 8. The mount is generally cylindrically shaped and has a large diameter lip 38c at the lower end 38a. Hollow cylindrical projection or extension 33 protrudes from the upper end 38b. The cylindrical surface of mount 32 has a helical groove 35 extending from end 38b to end 38a for receiving approximately 2.5 coils of spring 30. At end 38a of the mount a protrusion 39 is provided to form a locating stop for abutting the spring 30 when it is received in the groove.

As previously stated, each of the suspension elements has a different spring rate in order to maintain a vertical attitude of the tub and basket assembly. The differing spring rates of the elements are realized even though the unassembled springs are essentially identical because the lower spring mounts capture a different number of coils of each spring. This varies the number of free coils of each spring and because the spring constant of a spring is inversely proportional to the number of free coils, the spring constant or spring rate is different for each of the assemblies shown. Referring to FIGS. 4, 5 and 6, it can be seen that the upper spring mounts 31, 41 and 51 in each of the elements 26, 25 and 27 capture approximately 2.5 of the 14.5 coils of the spring shown. Element 26 has coils 30a through one half of 30p, and upper mount 31 captures coils 30m, 30n and one half of 30p. Element 25 has coils 40a through one half of 40p and upper mount 41 captures coils 40m, 40 n and one half of 40p. Element 27 has coils 50a through one half of 50p and upper mount 41 captures coils 50m, 50n and one half of 50p. The lower spring mount in FIG. 4 captures approximately 2.5 coils of the spring leaving 9.5 active spring coils, the upper half of 30c through 30L, in the element of FIG. 4. The lower spring mount in FIG. 5 captures approximately 3.5 coils of the spring leaving 8.5 active coils, the upper half of 40d through 40L, in the spring of the element of FIG. 5. The lower spring mount in FIG. 6 captures approximately 4.25 coils of the spring leaving 7.75 active coils, the upper three quarters of 50e through 50L, in the spring in the element 27 of FIG. 6. Thus, it can be seen that even though the springs 30, 40 and 50 in the respective elements 26, 25 and 27 are essentially the same the spring constants of the elements differ, element 27 having the highest spring rate, and element 26 having the lowest spring rate.

Although the arrangement shown is preferred, the same results of differing spring constants for the element could be accomplished by varying the length of groove in the upper element instead of the lower element or by a combination of varying groove lengths in upper and lower elements.

Although minor modifications might be suggested by those versed in the art, it should be understood that we wish to include within the scope of the patent warranted hereon all such modifications as reasonably and properly come within the scope of our contribution to the art.

The embodiments of the invention in which an exclusive property or privilege is claimed are defined as follows:

1. In an automatic wash machine having a cabinet, a cabinet base, and a rotatable receptacle assembly within said cabinet for spin drying laundry therein,
   a suspension means for suspending said receptacle assembly within said cabinet and above said base,
   said suspension means being formed by a plurality of vertically oriented spring assemblies each extending between a pair of machine members composed of said receptacle assembly and said cabinet base, each of said spring assemblies comprising,
   a helical spring having a pair of opposed end regions,
   an end member attached to each of said end regions, each of said end members further being connected to a different one of said machine members,
   said receptacle assembly suspended by the springs constituting a displaceable system subject to horizontal excursion during unbalanced rotatable spin drying,
   one of said end members having a projection with a free end thereof extending into the coils longitudinally within a portion of said helical spring, the outer side surface portions of said projection normally being spaced from the inner surface portions of said helical spring in the absence of any substantial horizontal displacement of said receptacle assembly and affording no vertical dampening when so spaced,
   said outer side surface portions of said projection being engageable with said inner surface portions of said helical spring for sliding frictional contact therebetween beginning adjacent said free end of said projection in response to substantial horizontal displacement of said receptacle assembly to oppose and dampen vertical forces acting on the receptacle assembly, and
   the degree to which vertical forces are opposed and dampened increasing proportionately as a function of the magnitude of such horizontal movement,
   thereby to contribute to preventing the receptacle assembly from contacting the cabinet.

2. In an automatic washing machine as defned in claim 1, said outer side surface portions of said projection being generally cylindrically shaped.

3. In an automatic washing machine as defined in claim 1, said projection being constructed of a material having respective static and dynamic coefficients of friction which are adapted to be substantially equal when said helical spring is in contact therewith.

4. In an automatic washing machine as defined in claim 1, said projection being provided with lubrication adapted to minimize the emission of sound from frictional engagement between said projection and said helical spring.

5. In an automatic washing machine as defined in claim 1, said projection being integrally formed with its associated end member, and said associated end member being adapted for connection with said cabinet base while the other of said end members is adapted for connection with said receptacle assembly.

6. In an automatic washing machine as defined in claim 1, wherein each of said end members has a cylindrical portion having a circumferential side surface with a helical groove defined therein and is adapted for threadedly receiving thereabout an end portion of said helical spring, and wherein said projection extends coaxially relative to the axis of said helical spring from the cylindrical portion of one of said end members when such is so threadedly received.

7. In an automatic washing machine as defined in claim 1, wherein, when said spring is compressed by longitudinally exerted forces applied to said opposed end members, the terminal end of said projection abuts against the other of said end members.

8. In an automatic washing machine as defined in claim 1, said projection being formed of a resilient material and being resiliently deformable to provide an increasing area of contact between said helical spring and said projection with an increasing transverse translation of one of said end members.

* * * * *